United States Patent

Hansen

[15] 3,636,757

[45] Jan. 25, 1972

[54] MEASURING THE TENDERNESS OF MEAT

[72] Inventor: Lee J. Hansen, Clarendon Hills, Ill.

[73] Assignee: Armour and Company, Chicago, Ill.

[22] Filed: May 15, 1970

[21] Appl. No.: 37,729

Related U.S. Application Data

[63] Continuation-in-part of Ser. No. 776,234, Nov. 15, 1968, which is a continuation-in-part of Ser. No. 705,722, Feb. 15, 1968, abandoned.

[52] U.S. Cl. .................................................. 73/81
[51] Int. Cl. ........................................... G01n 3/48
[58] Field of Search ........................ 73/78, 81, 84, 432

[56] References Cited

OTHER PUBLICATIONS

Szczesniak et al. " Methods *** Meas" from Advance in Food Research, vol. 14 June 1966 pp. 33, 74, 78– 86.

*Primary Examiner*—Richard C. Queisser
*Assistant Examiner*—Ellis J. Koch
*Attorney*—Carl C. Batz and Dawson, Tilton, Fallon and Lungmus

[57] ABSTRACT

In probe testing a body of raw meat which has been severed from the carcass to determine how tender the meat will be upon cooking, the meat body is supported in depth against lateral displacement as the probe is pressed into the meat body for measurement of the resistance of the meat to the movement of the probe.

4 Claims, 10 Drawing Figures

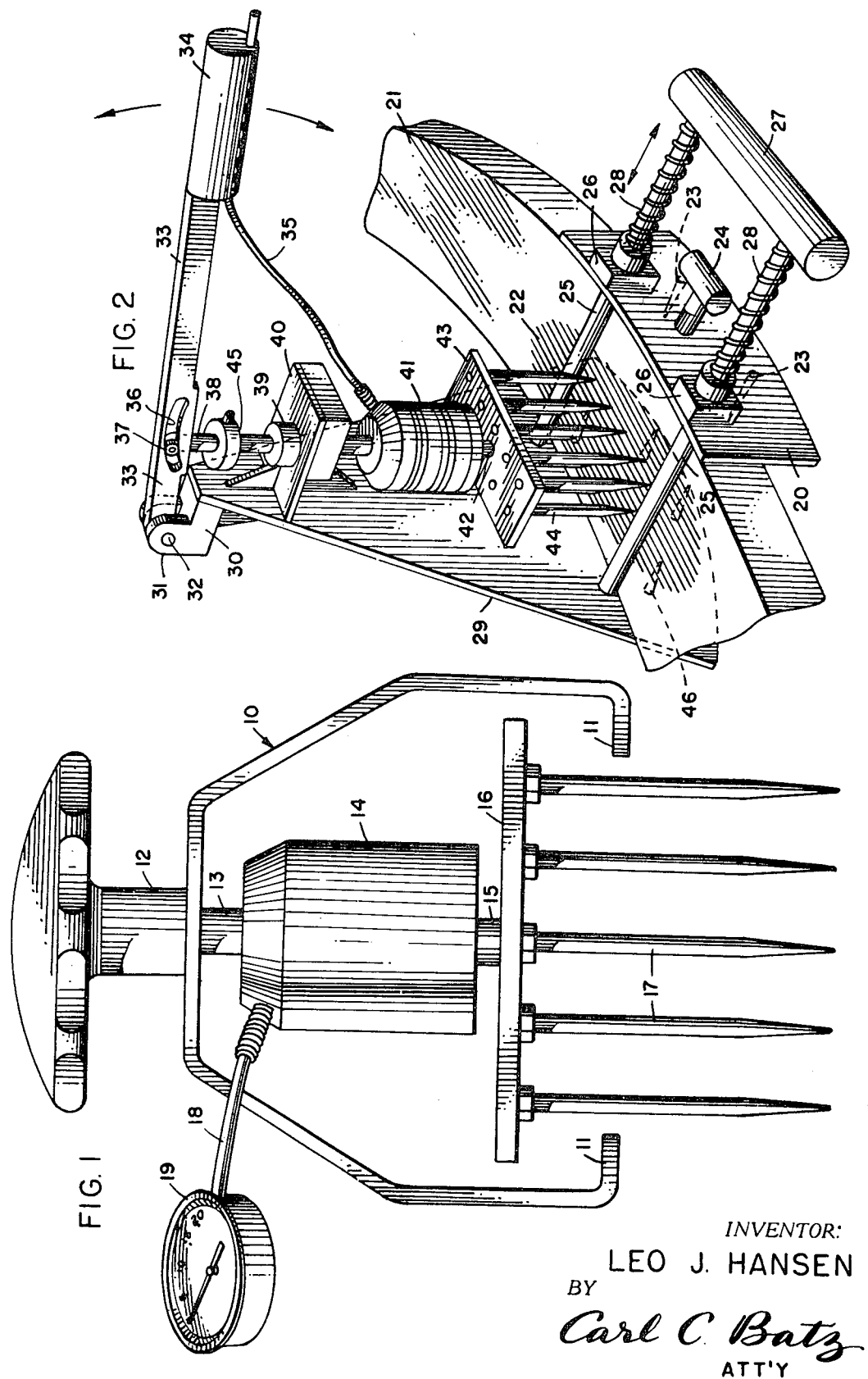

INVENTOR:
LEO J. HANSEN
BY:
Carl C. Batz
ATT'Y

INVENTOR:
LEO J. HANSEN
BY:
Carl C. Batz
ATT'Y

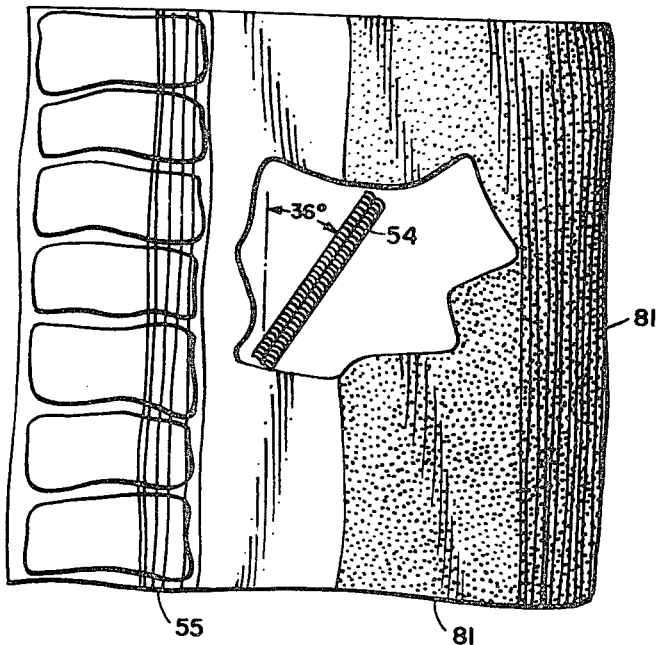

INVENTOR:
LEO J. HANSEN
BY:
Carl C. Batz
ATT'Y

MEASURING THE TENDERNESS OF MEAT

RELATED CASES

This application is a continuation-in-part of my copending application Ser. No. 776,234 filed Nov. 15, 1968, which application is a continuation-in-part of my application Ser. No. 705,722 now abandoned filed Feb. 15, 1968.

BACKGROUND AND SUMMARY

The housewife has long been troubled by the problem of determining tenderness in meat. Pressing a fork or finger into the meat gives a vague idea of softness, but there is no standard or measure which assures her that the meat when cooked will have a definite degree of tenderness. The meatpacker has long sought to solve the problem. There have been chemical tests, biochemical tests, and physical tests, but none have given a reliable measure of the tenderness of the raw meat which will carry over into the cooked product.

The structure of meat itself explains the difficulty. The connective tissues, which constitute about 10 percent or more of the total protein of the meat and which forms a network throughout the meat body, are very different from the contractile protein or muscle fiber which may constitute as much as 90 percent of the meat protein. On cooking, the contractile protein readily coagulates, while the connective tissue to some extent breaks down into gelatin. How can one predict the tenderness of the cooked product which may be free of some of the connective tissue when the test is made upon raw meat in which the connective tissue is an ever-present factor in determining the resistance to probing, etc.?

Among the physical tests, persons skilled in the art have used blunt heads or surfaces to press the meat, but here the connective tissue disappoints the measurements because the tissue draws together substantial meat areas. Pointed probes have been used in testing thin cuts of meat which are not suspended or supported except for a base support, but here the test fails because the meat of such cuts moves laterally during penetration by the probe and an accurate record of the resistance of the meat is not obtained.

In Technical Bulletin No. 1231 of Agricultural Marketing Service, U.S. Department of Agriculture (July 1961), penetrometer tests were made in which a spade-pointed needle carrying a 200-gram weight was allowed to penetrate thin meat cuts for 15 seconds in a direction parallel to the grain of the meat and the results recorded. It was found that there was no relationship between the penetrometer tests and tenderness, the conclusion being as follows:

"Penetrometer Measurements. This determination, which should indicate ease of muscle fiber separation, was made only on samples from the last 2 years of the study (102 carcasses). The results were not consistent for the 2 years, and the combined averages do not indicate any appreciable relationships between carcass grade or weight and penetrometer readings on raw ribeye."

I have discovered that when a needle or group of needles having pointed ends are pressed into the meat to a predetermined depth, the force used in moving the needle to such depth being measured and compared with a known standard, an extremely accurate, consistent and reproducible test of tenderness is achieved, and this is confirmed uniformly by subjective tenderness panels who evaluate the cooked meat. I have also discovered that consistent and reproducible results can be obtained even when the probe is pressed under constant pressure for a selected time into meat and the distance of penetration measured if the meat is suspended or supported on its sides during such penetration. Best results are obtained when the probe penetrates the meat at an angle to the grain of the meat (direction of muscle fiber orientation) and when the meat is classified as to intramuscular fat content and the tests are made within each class against standards established for the class.

When the above tests are made upon a section of the longissimus dorsi muscle, it is found that the prediction in general indicates the degree of tenderness for the muscle meat of the entire carcass.

A problem is presented in testing raw meat and particularly a raw meat body which has been severed from the carcass and which is limp and yieldable during handling, having a tendency to move or be displaced laterally during a probe test which diminishes the accuracy of the test. Even if thin slices of the meat are cut off for testing in a test apparatus, not only is such meat rendered unusable but also there is a tendency for the meat during testing to stretch and cling to the moving parts and thus fail to yield a fair measure of resistance for predicting tenderness in the meat when cooked.

I have discovered that if the meat body is supported in depth at the sides thereof so that it does not yield substantially during probe penetration, the probe can be pressed to a predetermined depth with accurate measurement of meat resistance while also after removal of the probe the meat body remains usable. Suspending the meat body during the probe test is advantageous, and the bottom of the meat body may also be supported so as to aid in holding the body in an upright stable position for probe testing. If a meat body severed from the carcass and free of bone is supported in an upright position, the probe or probes can be accurately pressed into the meat body at the desired angle to the grain of the meat.

DRAWINGS

In the accompanying drawings,

FIG. 1 is a side view in elevation of a simple instrument which may be employed in the practice of the process for measuring the penetration of probes or needles to a predetermined level in the meat;

FIG. 2, a somewhat similar instrument provided with means for anchoring it upon a forequarter of the carcass to bring the needles or probes into alignment with the ribeye of the carcass;

FIG. 3, a view similar to FIG. 1 but showing the housing of the transducer broken away to show the strain gauges and diaphragm, etc.;

FIG. 4, a schematic block diagram of an electrical system which may be employed with the structures shown in FIGS. 2 and 3;

FIG. 5, a side view in elevation of a suspended beef carcass half showing the carcass cut to expose the ribeye;

FIG. 6, a broken plan view on an enlarged scale of a section of the half carcass taken parallel with the rib and an inset view of greatly enlarged muscle fibers which extend within the ribeye muscle and angularly with respect to the backbone;

FIG. 7, another view showing the enlarged muscle fibers illustrated in FIG. 6, the view being taken parallel with the severed backbone at line 7—7 as indicated in FIG. 6;

FIG. 8, another view of the muscle structure and the angularly extending muscle fibers illustrated in FIG. 6, the view being taken, as indicated, at line 8—8 of FIG. 6;

FIG. 9, a support device for holding or suspending a piece of meat for probe testing in accordance with my invention; and FIG. 10, a broken side view in elevation of the device shown in FIG. 9 with a piece of meat held thereby.

DETAILED DESCRIPTION

Figure 5:
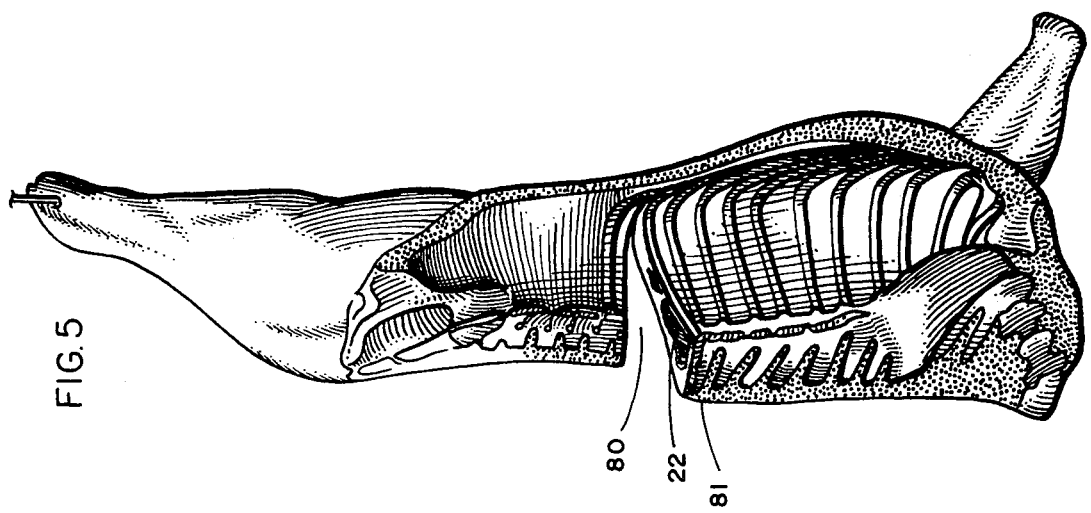

The process and apparatus which will be described herein are applicable to all types of meat, as, for example, the flesh of cattle, hogs, sheep, poultry, fish, and other edible meat. For the purpose of simplicity and clarity, however, the invention will be described herein in connection with beef carcasses and meat.

In the structure shown in FIG. 1, 10 designates a frame member in the shape of an inverted U and having at its bottom inwardly turned stops 11. The frame 10 may be provided with a fixed handle 12. Depending from the frame 10 is a support 13 to which is secured a transducer 14. From the transducer 14 extends a pressure member 15 secured to a plate 16 from which a number of needles 17 depend. These may be in the form of a block of needles which are spaced apart so as to engage simultaneously an area of muscle to determine the average tenderness of the area engaged. An electrical conduit 18 extends from the transducer to a recording gauge instrument 19 for indicating the force in terms of pounds employed in penetrating the meat to a depth provided by the stops 11. The strain gauge or transducer 14 may be of any suitable type, as, for example, the type shown in U.S. Pat. Nos. 2,472,047 or 3,130,382.

Any suitable measuring device may be employed for measuring the force of penetration of the meat and this may include a spring gauge and recorder and similar instruments. For example, a spring gauge with a "lazy hand" indicator may be employed, the lazy hand being moved during penetration of the meat to record the maximum force and remaining in position after penetration by the probe so that the operator can record the reading. The hand may then be moved manually back to the starting position. There are definite advantages, however, in employing electronic means for the extreme accuracy required during extensive and long usage, and in this operation there is induced in a transducer an opposing force equal to the force of penetration of the meat by the probe while generating an electrical signal representative of the opposing force. The signal, if desired, may be directly proportional to the induced opposing force, and the electrical signal may be in the form of visual indicia.

In the structure shown in FIG. 2, 20 indicates a bearing plate which is pressed against the outer surface of a carcass half 21, the cut exposing the ribeye portion 22 of the longissimus dorsi. The beef carcass is severed between the 12th and 13th ribs to expose the ribeye portion on the forequarter, while the loineye portion of the longissimus dorsi extends through the hindquarter.

The bearing plate 20 is preferably provided with inwardly extending prongs 23 and with a fixed handle 24. Rods 25 extend through bosses 26 fixed to the plate 20 and are secured at their rear ends by handle 27. Compression springs 28 extend between the bosses 26 and the handle 27. The rods 25 are secured at their inner ends to a clamp plate 29 which extends upwardly at an inclination and is fixed at its top to the anchor member 30. The plate 30 is provided with spaced ears 31 through which a pivot pin 32 extends to support the handle 33 between the ears 31. The handle 33 may be provided with a tubular grip 34 through which extends the electrical conduit 35 leading to an indicator gauge (not shown) but which may be similar to gauge 19, as shown in FIG. 1.

The handle 33 is provided with an arcuate slot 36 in which is mounted a roller 37 pinned to the upper end of stem 38. The stem 38 extends downwardly through the guide 39 carried by platform 40 fixed at its inner end to the clamp plate 29.

The stem 38 extends into a transducer 41 which may be similar to transducer 14 of FIG. 1, and a pressure stem 42 extends from the lower end of the transducer 41 to the plate 43 carrying the pointed probes or needles 44. The needles 44 are arranged in a block and may be arranged so as to traverse in a uniform way the cross section of the ribeye 22.

In order to limit the depth to which the needles descend, there is provided a stop 45 near the upper end of stem 38 and which will engage the guide boss 39 to limit downward movement of the needles 44.

If desired, the clamp plate 29 may be provided with inwardly extending pins 46 for engagement with the carcass portion 21 so that the testing apparatus will be firmly anchored to the carcass portion to produce uniform movement of the needles 44 with respect to the ribeye or other portion of the meat being tested.

In the practice of the invention, the carcass or meat portion to be tested is brought to a predetermined temperature for the testing operation, such as, for example, in the range of 30° to 50° F. and preferably in the range of 32° to 40° F. Test measurements may be made 12 or 24 hours after slaughter or after a week or more following slaughter.

By way of specific example, after a carcass has been chilled to about 32° to 40° F., the lower half 21, as shown in FIG. 2, may be secured as indicated in the drawing and the handle 33 lowered to move the needles 44 perpendicularly, the stop 45 limiting the downward movement so that the penetration is for 2 inches or any other selected depth. The force in pounds is registered on the gauge instrument, such as gauge 19, and the maximum force indicated on the gauge is recorded. The recorded force in pounds is then compared with a standard which has been previously determined and the deviation from the standard gives the degree of tenderness of the meat. In determining the standard, meat of a known tenderness, as determined, for example, by subjective tenderness panels, is tested under similar temperature conditions so that it provides a guide for the tests.

Figure 3:
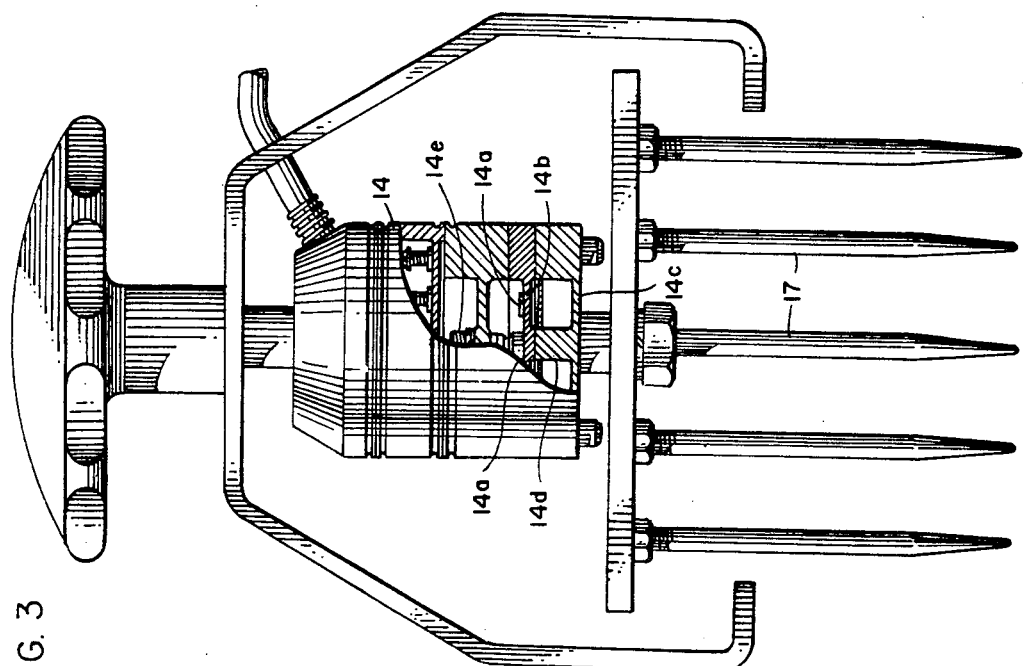
Figure 4:
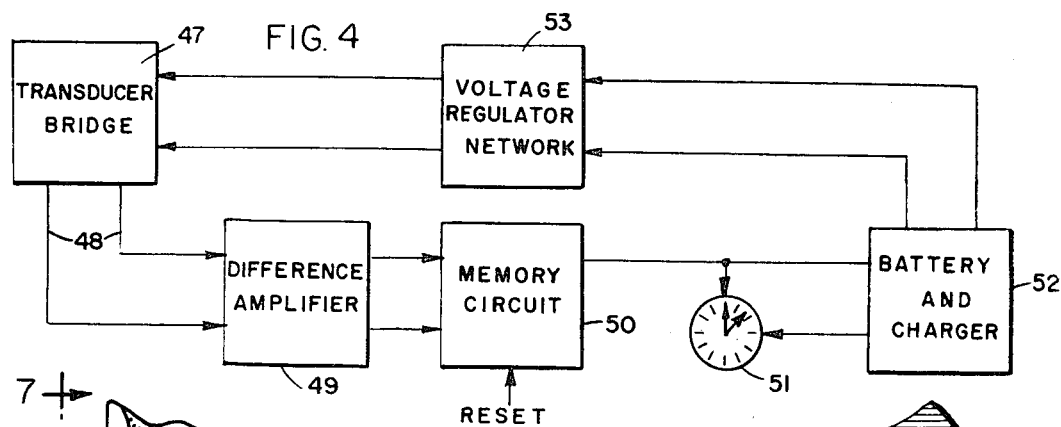

When electrical means are employed for measuring the resistance of the meat to the probes, I prefer to employ an instrument such as is shown best in FIG. 3 in a circuit as shown in FIG. 4. Referring to FIG. 3, strain gauges 14a are mounted on a flexible diaphragm 14b. The central portion of the diaphragm 14b is directly coupled to the center of a bottom 14c by means of a shaft 14d, and the upward movement of the diaphragm 14b is limited by means of an adjustable bolt 14e. While two strain gauges are shown in FIG. 3, it is preferred to use four semiconductor strain gauges which are mounted along a common diameter of the diaphragm 16.

Two of the four gauges are preferably arranged to measure compressive forces and the other two transducers are arranged to measure tensile forces.

For purposes of understanding the present invention, there is set out a functional block diagram of the entire circuit so that the function of each circuit element is shown in cooperation with the other elements. As shown best in FIG. 4, the transducer bridge is schematically designated by the block 47 and it generally operates an output signal along lines 48, the instantaneous difference in potential between the lines 48 being representative of the instantaneous penetration resistive force encountered by the probe needles 17 during insertion.

The signal lines 48 are fed to the input of a difference amplifier 49 which is modified to amplify only those signals representative of the insertion forces and to discriminate against signals of opposite polarity. The output of the difference amplifier 49 is coupled to a memory circuit 50 which includes a capacitor for storing charge. The capacitor is fed by a circuit which permits current to flow only unidirectionally so that if the insertion of the probe is unsteady and, for example, slows down for a short time so that the output signal from the transducer bridge 47 begins to diminish, the memory capacitor is cut off or disconnected from the output of the difference amplifier 49 during this period. Thus, if the force signal diminishes, charge is not drawn from the capacitor so that the accumulated charge on the memory capacitor in the memory circuit 50 is representative of the peak of the penetration resistive force encountered. The output of the memory circuit 50 is fed to a readout or recorder device 51 for displaying or recording the measurement.

A storage battery and charger circuit 52 is coupled through a voltage-regulating network 53 to energize the transducer bridge 47 so that the entire system is portable and may be set up at different locations. The battery may be recharged, and the voltage-regulating network 53 ensures the proper voltage level being fed to the resistive transducer bridge 47 so that operation is substantially independent not only of the charge state of the battery but also of the ambient temperature in which the system is being used. The battery and charger circuit 52 also contain a scaling circuit so that the charge state of the supply battery may be read by means of the readout device 51, which preferably is a meter, and properly scaled to indicate such charge state.

Figure 6:
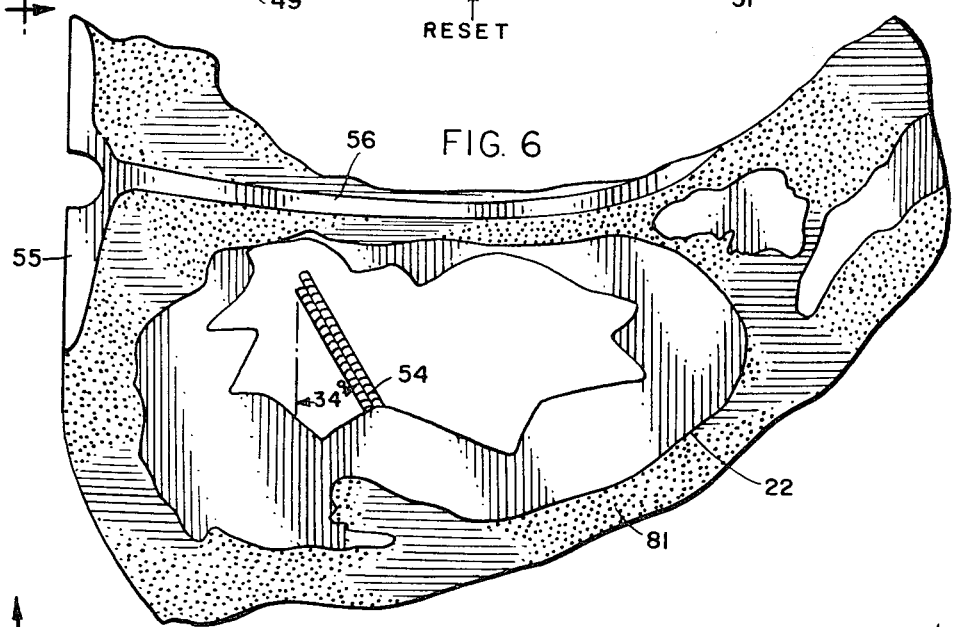
Figure 8:
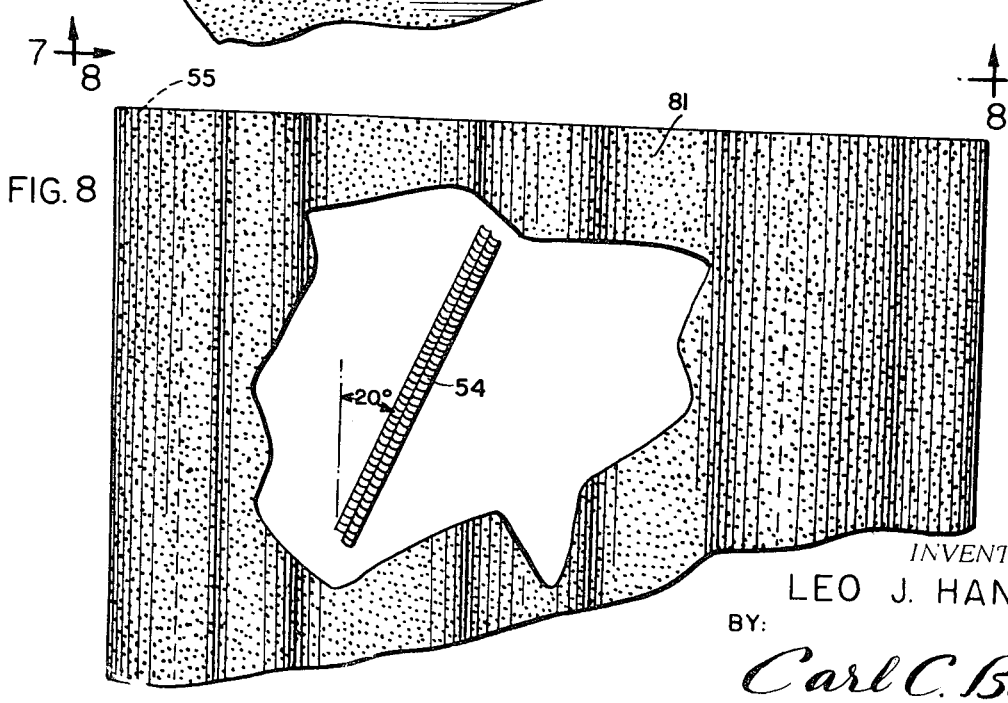

Excellent results can be obtained when the probe or probes are introduced into the ribeye or other muscle at an angle to the grain of the meat (direction of muscle fiber orientation). The muscle fibers 54 in the longissimus dorsi, as illustrated best in FIGS. 6, 7 and 8, run at an angle to the backbone. For example, as shown in FIG. 6, there is an angle of 34° between the muscle fibers and a line parallel to the backbone 55 of the carcass. The backbone 55 and a rib 56 are shown best in FIG. 6 of the drawings. In another view taken from line 7—7 as shown in FIG. 6, the muscle fibers 54 extend at an angle of 36° from a line parallel with the backbone 55. In FIG. 8, the muscle fibers 54 are shown to extend at an angle of 20° from a line parallel with the backbone 55. The three figures show the orientation of the muscle fibers which make up structure within the relatively large longissimus dorsi extending almost the full length of the backbone of the animal. The structure of this large muscle is attached by connective tissue to the backbone at many points along its length. While it might be expected that the muscle fibers extend longitudinally of the large muscle, they actually do not but instead extend at an angle with the length of the muscle and are oriented with respect to the backbone.

When the probes 17 are introduced into the face of the exposed ribeye lying generally in a plane transverse to the backbone, as shown in FIG. 6, and in a direction perpendicular to the face of the cut, it is found that the probes pass through the ribeye muscle at an angle of about 45° to the grain of the meat. By passing the probe into the meat at an angle to the muscle fibers, rather than in a direction parallel with the muscle fibers, a more accurate measure of the tenderness of the meat body is obtained. The angle between the prober and the fibers is preferably in the range of about 10° to 80° and best results are obtained when the angle between the probe and the muscle fibers is in the neighborhood of 45°.

Figure 9:
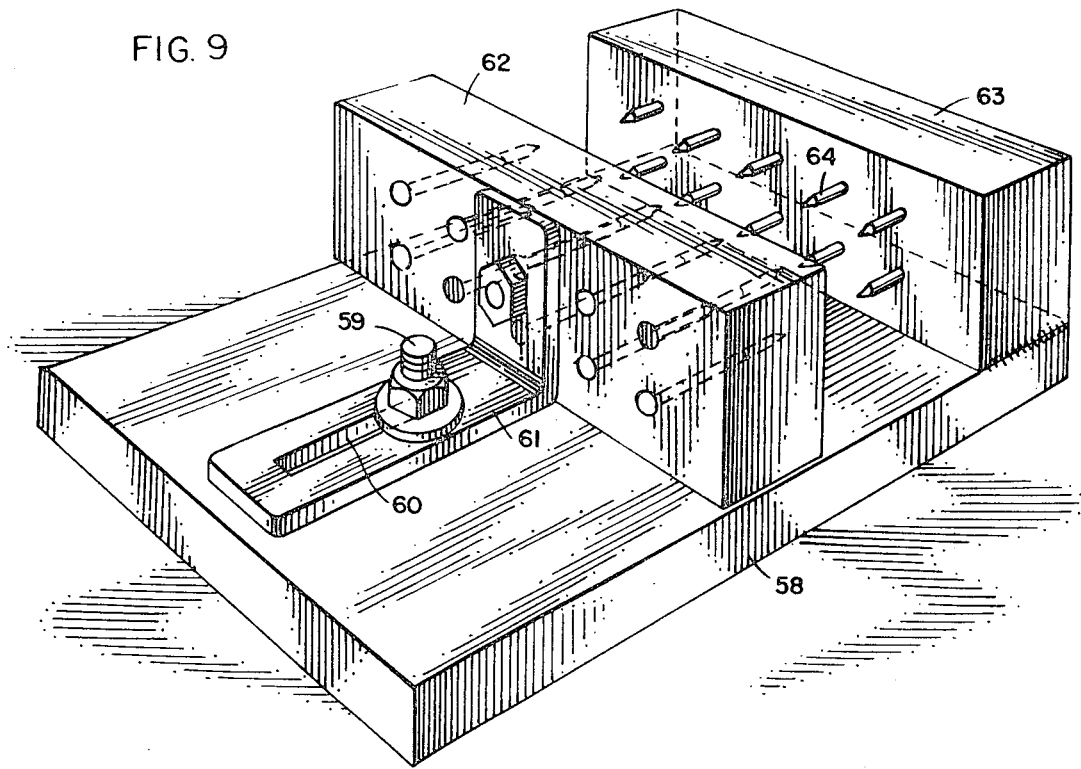
Figure 10:
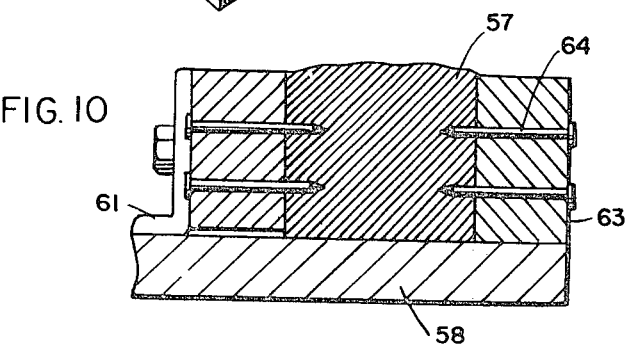

When the tests are made upon the ribeye muscle or similar muscles with the muscles supported within the carcass, as shown in FIGS. 5 and 6, very accurate measurements are obtained because the muscle is suspended and securely held by the bone structure of the carcass. The muscle is strongly attached to proximate bones and other tissues and ligaments by connective tissues so that the muscle is held securely during the testing operation. On the other hand, if thin cuts are made of the muscle and the cuts placed upon a supporting surface, the measurement becomes less effective because the muscle body moves away from the probe as the probe is pressed into the cut. In testing a meat body, such as, for example, a muscle cut indicated by the numeral 57, as shown in FIG. 10, I prefer to employ supporting and suspension means such as are shown by FIGS. 9 and 10. For example, a block 58 is provided with a guide bolt 59 extending through the slot 60 of angle member 61. The angle member 61 is secured to a clamping block 62 adjustably movable toward a stationary block 63, the two blocks being provided with stainless steel needles or retainer elements 64. This structure supports the meat body on several sides, and in addition suspends the meat so that the meat cut or body is supported firmly during penetration of the meat by the testing probes 17.

With the meat cut or body suspended as illustrated in FIG. 10, effective tenderness tests can be made even when a constant pressure, as by means of a weight, is employed for pressing the probes into the meat through a predetermined period of time and the extent of penetration measured. The suspension of the meat body enables such a test to be accurately utilized. However, I find that more satisfactory results are obtained when the probes are introduced into the supported or suspended meat cut to a predetermined depth, as, for example, to a depth of about 2 inches.

Another means for supporting the meat is illustrated in FIG. 2 in which the forequarter is shown with the severed longissimus dorsi muscle exposed for the penetration thereof by the pointed probes or needles 44, and the plate 20 together with the rods 25, clamp plate 29, and compression springs 28 provide a retainer for the meat being tested. Such a clamp retainer means may be used for a muscle piece after it has been extracted from the carcass so as to hold the muscle portion in its initial position or form during the penetrating test operation. Any suitable retainer means may be provided for holding the meat cut being tested against substantial distortion during the period when the pointed probes are being pressed into the meat.

When the carcass is suspended, as shown in FIG. 5, and the carcass body is severed to expose the longissimus dorsi muscle, an ideal arrangement for making the test is provided because the backbone and ribs of the carcass body together with the strong connective tissue suspend and support the muscle firmly during the test, and additional clamping means are not necessary.

In the manual apparatus illustrated in FIGS. 1 and 3, the U-shaped member 10 is provided with inwardly turned stops or feet 11, and when the probes are being pressed into the meat the feet 11 serve as indicators that the probes are being pressed evenly on all sides into the meat. In the pressing operation, the operator makes sure that the feet 11 contact the top surface of the meat at the same time.

In the testing of beef and other meat cuts where there is a varying intramuscular fat content, I find it important first to classify the meat according to the intramuscular fat content and then make the tests upon the meat portions in a particular class and then compare the results with standards which have been arrived at for this particular class. The reason for this is that when the tests are made, as I prefer to make them at a temperature in the range of about 32° to 40° F., the fat becomes relatively hard and this has an effect upon the resistance reading. It is important therefore to establish standards for each of the classes into which the meat portions fall by reason of the amount of intramuscular fat which they contain. By way of example, the meat body may be classified according to U.S. Department of Agriculture specifications into U.S. prime, U.S. choice, U.S. good, etc. In general, the prime classification contains more intramuscular fat than choice, and choice more than good, etc., so that these grades may be utilized as a classification according to intramuscular fat. Also, I can utilize any other classification which recognizes the difference in intramuscular fat.

Thus, in a preferred operation, a beef carcass may be suspended and the carcass sawed vertically through the backbone to provide two carcass halves, and the suspended half then severed between the 12th and 13th ribs. In actual operation, the operator locates the top of the 13th rib at approximately the center of the side, inserts the knife, and makes a cut along the rib toward the flank, then reverses the knife and cuts to the backbone where he meets a cut made by the operator sawing the backbone. The knife cut meets the sawed cut evenly so that there is no offset. The forepart of the carcass then drops down somewhat to open the carcass providing a V-shaped opening indicated by the numeral 80 in FIG. 5, thus to expose the ribeye. An examination at this time enables a skilled person to determine the class of the carcass. If at this time the marbling or intramuscular fat content of the ribeye of a particular carcass indicates that the carcass falls under the class of U.S. choice, for example, the operator, after testing the ribeye as heretofore described with the probes, compares the deviation of the recorded force from a known standard relating to the U.S. choice class, and from this an accurate prediction of the tenderness of the ribeye cut is obtained. Further, since the longissimus dorsi is an accurate indicator of the tenderness of the entire carcass, the measurement is applicable to the other cuts of meat in the carcass.

My methods can be practiced without reference to any predetermined standard simply by taking a number of carcasses and arbitrarily or by any preselected rule, dividing them into different classes according to their intramuscular fat content, the relatively high intramuscular fat content carcasses being put in one class and the relatively low intramuscular fat content carcasses in another class. Then the carcass portions of each class are tested and each reading is compared with the other readings in the same class. From this comparison the relative tenderness of each carcass portion is readily obtained. In one sense, this practice utilizes the readings obtained on the other carcasses of the same class as a standard against which the readings as to each carcass may be compared. For example, each reading within the class may be compared to the average of the other readings in this same class to determine if the meat in this carcass is relatively more tender or relatively less tender than the average of the lot. After a large number of readings have been taken for any prescribed class, a general standard is obtained against which the readings of any carcass of similar intramuscular fat content can be compared. The results so obtained are found to be more reliable than if the tests are made without the initial classification as to intramuscular fat content.

The precise relationship between the intramuscular fat content to the amount of resistance to the penetration of a probe into the muscle is not now known, but I have found that, in general, the greater the amount of this type of fat content in the muscle, the greater will be the resistance to probe penetration, other conditions remaining the same, and in particular, I find that any amount of fat would affect the resistance rending to a greater extent at lower temperatures, down to temperatures approaching freezing. For these reasons I find it important, in order to get best results, to work in as narrow a range of temperatures and as narrow a range of intramuscular fat content as is practical. Preferably, the carcasses to be tested should first be classified as to intramuscular fat content and then the carcass portions of each such class checked to see that their temperatures fall within a preselected range before the probes are inserted and readings taken. From the observation above expressed that a higher temperature of the intramuscular fat affects the resistance reading to a lesser degree, it might be supposed that one should prefer the higher temperature of meat in the conduct of the tenderness test, but this is not actually the case. I find that there is actually greater accuracy and dependability of the test results when the temperature is kept low, such as in the range of about 32° to 36° F.

Why the methods herein described will accurately predict how tender the meat will be on cooking when, in effect, the cooked meat is quite different from the raw meat, the connective tissue to some extent becoming gelatin in the cooked meat and the contractile protein or muscle fibers becoming coagulated, I am unable to state with any degree of certainty. It may be that the network of connective tissue in the raw meat has an irregular gathering effect during penetration causing erratic and high forces to register before the full depth is reached, while a constant depth of penetration with the pointed probe or needle minimizes or averages out the connective tissue factor so that the net measurement is substantially that of the muscle fiber or contractile protein and residual undegraded connective tissue which together determine the tenderness of the cooked meat. In any event, the measurement of the force of penetrating the raw meat to a fixed depth with the pointed probe, as described above, does accurately predict the tenderness of the cooked meat.

As above stated, I prefer to test a cross section of the longissimus dorsi muscle because this not only is a valuable meat portion but I find it is surprisingly indicative of the character of the other muscles in the carcass, and thus by determining the tenderness of the ribeye or loineye, an accurate prediction of the tenderness of all muscle portions of the carcass is furnished.

I am also unable to say with certainty why it is possible, as herein set forth, to obtain more accurate results when the pointed probes are inserted at an angle with the direction of the grain of the meat, or more particularly, lengthwise of the longissimus dorsi muscle, and at an angle with the fibers of the muscle. It may be that tenderness is a function of both the resistance to cross-penetration or rupturing of the fibers and of the resistance of the fibers to separation one from another. By passing the probes at an angle to the fibers, both of these factors are taken into account in producing the resistance reading.

While my invention may be practiced using but a single probe or needle for penetrating the meat, I prefer to use a plurality of probes because in this way the resistance reading obtained measures the total of the resistance to all the probes which, when related to the readings of other tests, amounts to the equivalent of a comparison of the average resistance to the probes and in this way, error is minimized.

Further, I prefer to arrange the configuration and spacing of the probes or needles so as to conform with the outline of the muscle being tested and to penetrate representative portions of such muscle. In the specific probe device herein described, there are 10 probes designated by the character 17 and these are arranged in rows of five in one direction and two in the other direction each equidistant to the other to make a pattern roughly conforming to the longissimus dorsi muscle. This enables the operator to confine the penetration to the muscle and to penetrate it at equally spaced points over its cross-sectional area. This feature is important as may be seen especially by reference to FIGS. 2 and 6 where there are definite fatty areas 81 located peripherally of the muscle 22. Thus, the probe conforms generally to the length and breadth of the muscle and makes it easy to avoid the situation where one or more of the probes would penetrate the fatty area 81 instead of the muscle itself and thus to avoid error in the reading obtained.

In the foregoing description of my methods I have referred to classifying the carcass according to intramuscular fat content, separating the classes and conducting tests for comparison within each class. This should not be taken in a sense which would require physical separation and spacing of the carcasses, although this actual physical separation may be done. In packinghouse operations there may be 10, 100, or 1,000 carcasses in a large cooler where the carcasses are brought down to the final chilled temperature, such as 32° to 36° F. with these carcasses hanging close to each other on rails within the cooler. Although it is possible to classify the carcasses as to intramuscular fat content and separate them physically with different classes on different rails, this is not essential. The carcasses may be left in their same physical locations as they come into the cooler and the operator, in conducting the tenderness tests, may approach each carcass down the line as it is suspended on the rail, making tests and making a tabulation as he goes along, giving in the tabulation an identification for each carcass half or other carcass portion together with its class as to intramuscular fat content, giving its temperature or noting if it is in the preselected temperature range, and noting the reading obtained from the dial 19 of the testing device for this particular carcass or carcass portion. This practice gives the necessary classification and separates the classes so that resistance readings may be readily compared within each class. From this tabulation can be obtained the identification of each carcass portion within each class as to intramuscular fat content and the identification of each carcass portion within each range of tenderness which may have been previously set as to fat content in each class. Such information enables characterization by the packer of each portion according to tenderness, which has never before been possible.

I have found that the resistance readings taken of the longissimus dorsi muscle in the left half of the carcass compare very closely to those taken in the muscle in the right half of the same animal carcass so it is not necessary that tests be made on both halves of the same carcass and the reading made on the one half of a carcass may be taken as applicable to the other half as well. Accordingly, when the operator moves through the cooler making tests, he may simply skip the left halves (or the right halves) and pass on to the next carcass half.

The freezing and thawing of the meat is found to produce negligible changes in the tenderness quality of the meat; hence after the tenderness tests are made, the meat may be frozen and held for weeks or months. The meat may be thawed and cooked and will be found to reflect the tenderness qualities indicated by the test on the raw meat before freezing.

The temperatures at which the tests may be made are not critical. The tests may be made immediately after slaughter, but this is not preferred because of the softness of the fat and for other reasons, and during rigor mortis the muscles contract and it is not a desirable time to make the tests. Preferably the tests are made after rigor mortis and after cooling the carcass. The carcass should not be cooled to the extent that ice crystallization occurs, and preferably the temperature should not be raised to the point where bacteria causes deterioration of the meat, such as slime-forming bacteria. While great latitude is permitted with respect to temperatures, I prefer to bring the meat after slaughter and after the period of rigor mortis to a temperature in the range of 32°–40° and to make the tests at a temperature within this range. Such a range allows ready correlation with taste panel tests and the proper calibration of the measuring instruments.

Specific examples illustrative of the process may be set out as follows:

EXAMPLE I

Penetration resistance measurements of three U.S. choice beef carcasses were made 24 hours after slaughter when the internal temperature of the ribeye has been brought down to 32°–40 F. The ribeye was exposed in the customary manner by partially severing the carcass between the 12th and 13th ribs. The multiple needle probe, as shown in FIG. 1, was then forced in to a depth of exactly 2 inches going perpendicularly into the face of the exposed ribeye.

For the test work, the short loins were taken, after breaking the carcasses into wholesale cuts, and held at 32°–40° F. for 1 week after slaughter. Two inch thick slices were then cut off and roasted in a 350° oven to 150° F. internal temperature.

Samples of cylindrical shape, 1 inch in diameter, were cut out and the browned surfaces cut off before presentation to panel members. Samples identified only by code designation unknown to the judges were presented to a panel of eight skilled and experienced judges. The judges were asked to evaluate the tenderness on a hedonic scale which ranged from 8 (extremely tender) down to 1 (extremely tough). Panel scores were taken by averaging the eight responses.

The results were as follows:

| Sample No. | Needle Penetration Resistance | Sensory Panel Score |
| --- | --- | --- |
| 1 | 11.3 lbs. | 7.1 |
| 2 | 15.7 lbs. | 6.0 |
| 3 | 21.5 lbs. | 5.1 |

EXAMPLE II

Tests were made in the manner described in example I of samples of beef carcasses 1 week after slaughter during which time the internal temperature of the carcass was held in the range of 32°–40° F. and panel tests were made at the time. The results were comparable to those described in example I, thus demonstrating that the needle penetration to a constant level tests accurately predict tenderness even though the penetration tests were made on meat at a longer time after slaughter.

EXAMPLE III

A number of beef carcasses suspended, as shown in FIG. 5 of the drawings, were tested by the manual instrument shown in FIGS. 1 and 3 of the drawings. The carcasses with the ribeye exposed, as shown in FIGS. 5 and 6, were classified, in one class the U.S. prime and U.S. choice being grouped together, and in the other class were placed carcasses having less marbling or intramuscular fat. The probe assembly was applied so that the needles were located in the approximate center of the ribeye muscle and thus did not contact any sinew, cartilage, bone, or cover fat, the probes extending into the ribeye muscle at an angle of about 45° to the inclination of the muscle fibers. With a steady, smooth pressure, the needles were pressed downwardly until the stop indicators or feet 11 just touched the surface of the ribeye. The readings were then made from the dial. After each reading, the dial arm was brought back to zero.

In the first grade, which included U.S. prime and U.S. choice, all resistance readings up to 15 pounds were stamped with the code letter P, indicating high tenderness. For the resistance reading between 15.1 up to 18, the letter A was stamped upon the carcass to indicate the acceptable but lower degree of tenderness.

Similar stamps of the code letters were placed upon the chuck, rib, short loin, loin end, and round cuts of the carcass.

In testing the other grades below U.S. prime and U.S. choice, resistance readings up to 13 received the stamp P for the carcass, while carcasses in which the resistance readings were from 13.1 to 15 received the stamp A, and similar stamping was made upon the five places on each side, namely, the chuck, the rib, the short loin, the loin end, and the round portions of the carcass.

EXAMPLE IV

Tests similar to those described in example III were made upon suspended hog carcasses and the resistance determinations made, the longissimus dorsi muscle being tested by prongs fitting the area of the severed muscle.

EXAMPLE V

Resistance readings by prongs such as described in example I may be utilized by pressing the same into the breast of poultry to determine the tenderness of the breast muscle. Similarly, tests may be made upon the dark meat of the poultry.

A raw fish carcass may be treated as described above in the case of poultry and the tenderness of the meat muscle determined by the resistance readings.

In the case of both poultry and fish, the bone structure is preferably used for supporting the meat in firm position during the testing operation.

While in the foregoing specification I have set forth specific apparatus and steps in considerable detail for the purpose of illustrating embodiments of the invention, it will be understood that such details may be varied widely by those skilled in the art without departing from the spirit of my invention.

I claim:

1. In a process for testing a raw meat body to determine how tender it will be upon cooking, the steps of pressing a pointed probe under a constant weight pressure and for a predetermined period of time into the body which is mounted in suspension and held firmly in its original form against substantial distortion during penetration by said probe, and measuring as an indication of tenderness the extent of penetration in depth of the meat by the probe during said period of time.

2. The process of claim 1 in which said meat body is substantially free of bone and is suspended along its sides.

3. The process of claim 1 in which a plurality of probes uniformly spaced over the top face of the meat body are pressed into the meat body.

4. The process of claim 1 in which sides of said meat body are supported against lateral displacement.

* * * * *